(12) United States Patent
Dalal et al.

(10) Patent No.: US 7,706,281 B2
(45) Date of Patent: Apr. 27, 2010

(54) SELECTING PATHS IN MULTI-HOMED TRANSPORT-LAYER NETWORK ASSOCIATIONS

(75) Inventors: Mitesh Dalal, Santa Clara, CA (US); Randall R. Stewart, Chapin, SC (US)

(73) Assignee: Cisco Technology, Inc., San Jose, CA (US)

( * ) Notice: Subject to any disclaimer, the term of this patent is extended or adjusted under 35 U.S.C. 154(b) by 1044 days.

(21) Appl. No.: 11/326,841

(22) Filed: Jan. 6, 2006

(65) Prior Publication Data

US 2007/0159977 A1    Jul. 12, 2007

(51) Int. Cl.
    H04J 1/16    (2006.01)
(52) U.S. Cl. .................. 370/237; 370/349; 370/389; 370/463; 370/475
(58) Field of Classification Search ................ 370/352, 370/227, 228, 248, 249, 237, 349, 389, 463, 370/475
    See application file for complete search history.

(56) References Cited

U.S. PATENT DOCUMENTS

| | | | |
|---|---|---|---|
| 6,678,283 B1 * | 1/2004 | Teplitsky | 370/463 |
| 6,694,471 B1 * | 2/2004 | Sharp | 714/749 |
| 6,768,726 B2 * | 7/2004 | Dorenbosch et al. | 370/331 |
| 6,826,198 B2 * | 11/2004 | Turina et al. | 370/467 |
| 7,111,035 B2 * | 9/2006 | McClellan et al. | 709/201 |
| 7,304,448 B2 * | 12/2007 | Dobashi | 318/649 |
| 7,366,096 B2 * | 4/2008 | Swami | 370/231 |
| 7,386,624 B2 * | 6/2008 | Venkatsubra et al. | 709/231 |
| 2005/0022089 A1 * | 1/2005 | Le et al. | 714/749 |
| 2005/0047391 A1 * | 3/2005 | Tuxen | 370/351 |
| 2005/0091307 A1 * | 4/2005 | Venkatsubra et al. | 709/203 |
| 2005/0157726 A1 * | 7/2005 | Vesterinen | 370/395.5 |
| 2005/0281288 A1 | 12/2005 | Banerjee et al. | |
| 2006/0018301 A1 * | 1/2006 | Schrufer | 370/351 |
| 2006/0117116 A1 * | 6/2006 | Huang | 370/349 |
| 2006/0133343 A1 * | 6/2006 | Huang | 370/349 |
| 2006/0164974 A1 * | 7/2006 | Ramalho et al. | 370/219 |
| 2006/0221840 A1 * | 10/2006 | Yasuoka et al. | 370/242 |
| 2008/0168176 A1 * | 7/2008 | Bruss | 709/230 |

OTHER PUBLICATIONS

Stewart et al.; "Stream Control Transmission Protocol"; 2000; Networl Working Group; pp. 1-102.*

(Continued)

*Primary Examiner*—Ricky Ngo
*Assistant Examiner*—Dewanda Samuel
(74) *Attorney, Agent, or Firm*—Hickman Palermo Truong & Becker LLP

(57) ABSTRACT

A multi-homed network node comprises an interface that is addressable using a primary network address and a secondary network address. Network packets identifying the primary network address traverse a first network path and packets identifying the second network address traverse a second network path that is routed physically separately from the first network path. A transport layer network protocol association is established in the network between a first node and the multi-homed node. One or more data messages are sent to the second node and identify the primary network address. Network feedback information indicates one or more performance characteristics of the first network path. In response, the data messages are automatically modified to identify the secondary network address.

18 Claims, 5 Drawing Sheets

OTHER PUBLICATIONS

R. Stewart et al., "Stream Control Transmission Protocol (SCTP) Packet Drop Reporting," IEFT Internet-Draft draft-stewart-sctp-pktdrprep-02.txt, Feb. 8, 2005, pp. 1-14.

J. Mogul et al., "Path MTU Discovery," IETF Network Working Group RFC 1063, Nov. 1990, pp. 1-20.

R. Stewart et al., "Stream Control Transmission Protocol," IETF Network Working Group RFC 2960, Oct. 2000, pp. 1-126.

Anonymous, "Transmission Control Protocol," IETF RFC 793, Information Sciences Institute of the University of Southern California, Sep. 1981, pp. 1-88.

The Cable Guy, "Path Maximum Transmission Unit (PMTU) Black Hole Routers," Jul. 2004, <URL: http://www.microsoft.com/technet/community/columns/cablequv/ca...>, retrieved on May 5 2006 (3 pages).

J. Postel, "The TCP Maximum Segment Size and Related Topics," retrieved from < URL: http://www.csl.sony.co.jp/cgi-bin/hyper-rfc?rfc879.txt>, on May 5, 2006. (10 pages).

The TCP/IP Guide, "IP Datagram Size, the Maximum Transmission United (MTU), and Fragmentation Overview," retrieved from < URL: http://www.tcpipguide.com/free/IPDatagramSizetheMaximumTra >on May 5, 2006 (3 pages).

Mac OS Xhints, "A script to determine Maximum Transmission United," retrieved from: < URL: http://www.macosxhints.com/article.php?story=20060201155734147>, on May 5, 2006 (4 pages).

Cisco Systems, Inc., "Understanding Maximum Transmission Unit (MTU) on ATM Interfaces," retrieved from: < URL: http://www.cisco.com/warp/public/121/mtu_atm.html>, retrieved on May 5, 2006 (8 pages).

* cited by examiner

SELECTING PATHS IN MULTI-HOMED TRANSPORT-LAYER NETWORK ASSOCIATIONS

FIELD OF THE INVENTION

The present invention generally relates to network data communications. The invention relates more specifically to techniques for managing transport-layer protocols across network security devices such as network address translators and firewalls.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Stream Control Transmission Protocol (SCTP) is defined in IETF RFC 2960. This description assumes the reader has familiarity with and understands RFC 2960. SCTP is also described in R. Stewart et al., "Stream Control Transmission Protocol" (Boston: Addison-Wesley, 2001) ("Stewart et al." herein).

SCTP can support of multi-homed network nodes, which are network elements such as routers and switches that can be reached using any of several network addresses. SCTP nodes and intermediate nodes in a network may be configured so that traffic from one node to another travels on physically different routed paths if different destination network addresses are used in a packet. In such a configuration, SCTP associations become tolerant against physical network failures.

In present practice, only a loss of connectivity will cause an SCTP implementation to change the destination network address of a destination node. Thus, the use of multi-homed nodes with SCTP associations is limited. Network path characteristics can change over the lifetime of an association, but when performance of a network path to a first destination of an address declines, presently there is no way to change the destination network address to a second address that may provide better performance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
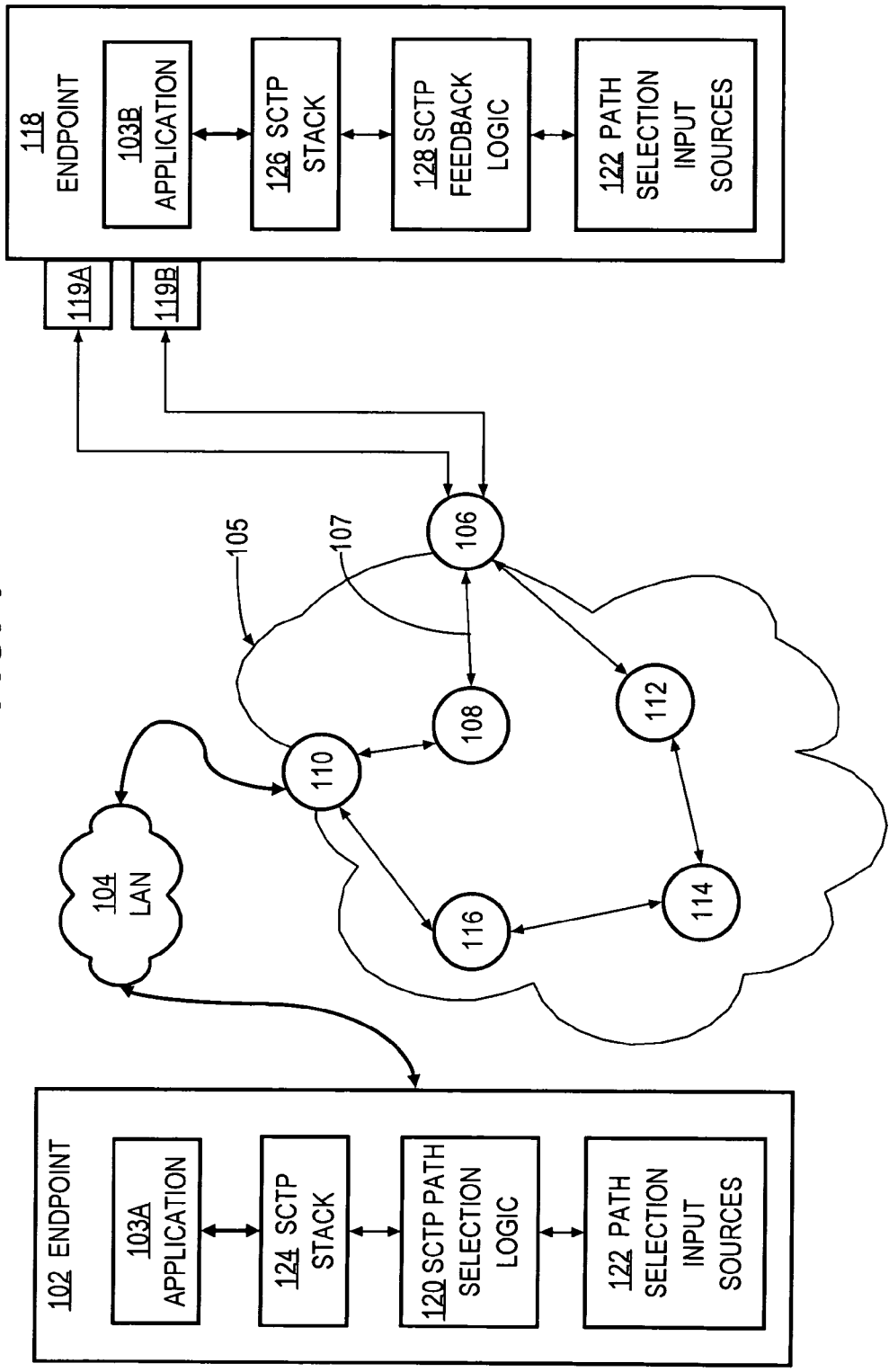
FIG. 1 is a block diagram that illustrates an example network arrangement that may be used to implement an embodiment.

A method and apparatus for selecting paths in multi-homed transport-layer network associations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Stream Transmission Control Protocol (SCTP) Approach For Selecting Paths In Multi-Homed Associations
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises a method and device that are configured as further described herein.

Generally, in the approach of the invention, a multi-homed network node comprises an interface that is addressable using a primary network address and a secondary network address. Network packets identifying the primary network address traverse a first network path and packets identifying the second network address traverse a second network path that is routed physically separately from the first network path. A transport layer network protocol association is established in the network between a first node and the multi-homed node. One or more data messages are sent to the second node and identify the primary network address. Network feedback information indicates one or more performance characteristics of the first network path. In response, the data messages are automatically modified to identify the secondary network address.

Thus, in one aspect the redundant and separate physical path to a multi-homed device is used intelligently if the existing path starts having less than satisfactory performance. The techniques herein help in determining or forecasting the deteriorating link condition and taking action after such detection to maintain throughput of a connection as high as possible.

According to one aspect, the invention provides a network packet routing device, comprising one or more processors; one or more network interfaces that are communicatively coupled both to the one or more processors and to the network for receiving packet flows therefrom; and a computer-readable medium comprising one or more sequences of instructions which, when executed by the one or more processors, cause the one or more processors to perform the steps of: configuring in a data communication network a first node, a second node, and one or more other nodes, wherein the second node comprises at least one interface that is addressable using at least one primary network address and at least one secondary network address, wherein the configuring causes network packets identifying the primary network address to traverse a first network path and causes network packets identifying the second network address to traverse a second network path that is routed physically separately from the first network path; establishing a transport layer network protocol association in the network between the first node and the second node; sending one or more data messages to the second node, wherein the data messages identify the primary network address; receiving network feedback information that indicates one or more performance characteristics of the first network path; and automatically modifying the data messages to identify the secondary network address.

In one feature of this aspect, the transport layer protocol is Stream Transmission Control Protocol. In another feature, the network feedback information is communicated in an SCTP network feedback chunk. In still another feature, automatically modifying the data messages to identify the secondary network address is (a) delayed by a specified time and (b) performed only upon receiving one or more network feedback messages that indicate congestion on the first network path.

In yet another feature, the one or more performance characteristics comprise congestion on the first network path. In a further feature, the transport layer network protocol association is marked as temporarily switched, and wherein the transport layer network protocol association is subsequently marked as permanently switched only upon receiving one or more further network feedback messages that indicate continued congestion on the first network path.

In still another feature, the data messages are automatically modified to identify the primary network address when the one or more further network feedback messages indicate one or more improved performance characteristics on the first network path. In yet another feature, a dampening timer prevents further automatically modifying the data messages to identify the secondary network address until after a specified time.

In still another feature, the network feedback information comprises any of a packet drop indication, an explicit congestion notification, a link maximum transmission unit value, a path maximum transmission unit value, and an implicit congestion determination based on a dropped segment count.

In another aspect, the invention provides a method, comprising: configuring in a data communication network a first node, a second node, and one or more other nodes, wherein the second node comprises at least one interface that is addressable using at least one primary network address and at least one secondary network address, wherein the configuring causes network packets identifying the primary network address to traverse a first network path and causes network packets identifying the second network address to traverse a second network path that is routed physically separately from the first network path; establishing a transport layer network protocol association in the network between the first node and the second node; sending one or more data messages to the second node, wherein the data messages identify the primary network address; receiving network feedback information that indicates one or more performance characteristics of the first network path; and automatically modifying the data messages to identify the secondary network address.

In one feature, the method is performed in any of a router for a packet-switched network and a switch for a packet-switched network.

In other aspects, the invention encompasses a computer apparatus and a computer-readable medium configured to carry out the foregoing steps. Example apparatus include a router, switch, network address translator, network address port translator, firewall, etc.

2.0 Structural and Functional Overview

FIG. 1 is a block diagram that illustrates an example network arrangement that may be used to implement an embodiment. A first endpoint 102 and a second endpoint 118 are communicatively coupled to a network 105 directly or indirectly through a LAN 104. Endpoints 102, 118 may be network end stations such as workstations, personal computers, printers, laptops, PDAs, etc., or may be network infrastructure elements such as routers, switches, etc. Each of the endpoints 102, 118 can serve as a logical endpoint in a transport-layer network protocol connection or association under a communication protocol such as Stream Control Transmission Protocol (SCTP) or Transmission Control Protocol (TCP) as defined in RFC 793.

Network 105 comprises a plurality of routers 106, 108, 110, 112, 114, 116 that are communicatively coupled and are located at geographically distributed locations. In one embodiment, routers 110, 106 are edge routers of a service provider (SP) network and routers 108, 112, 114, 116 are core routers of the SP network.

Endpoint 118 is a multi-homed endpoint that has first and second interfaces 119A, 119B. Packets are routable in networks 104, 105 to the interfaces 119A, 119B using distinct and different network addresses. In an Internet Protocol (IP) implementation, interfaces 119A, 119B each have different IP addresses.

Endpoint 102 comprises an application 103A, SCTP stack 124, SCTP path selection logic 120, and one or more path selection input sources 122. SCTP stack 124 comprises one or more computer programs or other software elements that implement SCTP. SCTP path selection logic 120 comprises one or more computer programs or other software elements that implement certain functions that are further described herein. Path selection input sources 122 comprises sources of information that the SCTP path selection logic can use to determine whether to change routing paths for packets directed to a multi-homed endpoints. Endpoint 102 also hosts application 103A, which is any application program that communicates data on an association that SCTP stack 124 facilitates. For example, application 103A is an implementation of Border Gateway Protocol (BGP), a data communication application, an e-commerce application, etc.

In one embodiment, endpoint 102 is communicatively coupled through network 105 to endpoint 118 using a physically separately routed communication path for each of the interfaces 119A, 119B of endpoint 118. For example, a first path passes from endpoint 102 to LAN 104 and routers 110, 108, 106, in that order, to reach interface 119A of endpoint 118. A second path passes from endpoint 102 to LAN 104 and routers 110, 116, 114, 112, in that order, to reach interface 119B of endpoint 118. The first path and second path can be established, for example, by configuring endpoint 102 with specified IP strict routes for each of the destination IP addresses associated with interfaces 119A, 119B, respectively.

In this approach, endpoint 118 provides redundancy and fault tolerance, because if interface 119A or router 108 fails, packets may be directed to interface 119B on the other routing path. However, in conventional practice, a switchover from the first path to the second path, or from the first interface to the second interface, is performed only in response to a total loss of connectivity on a path or to an interface.

Endpoint 118 further comprises an application 103B, SCTP stack 126, SCTP feedback logic 128, and path selection input sources 122. In one embodiment, applications 103A, 103B are complementary and communicate with one another over SCTP associations. SCTP feedback logic 128 comprises one or more computer programs or other software elements that implement certain functions that are further described herein. Based on input from path selection input sources 122, SCTP feedback logic 128 can construct SCTP chunks containing information indicating characteristics of a communication path between endpoint 102 and endpoint 118.

For example, if a first path traversing LAN 104, router 110, router 108, and router 106 is congested, path selection input sources 122 may indicate such congestion. In response, SCTP feedback logic 128 can construct and send endpoint 102 an SCTP chunk that reports such congestion. SCTP path selection logic 120 at endpoint 102 then can use the received congestion information to determine whether to change to a different path of the multi-homed endpoint 118. The following sections describe such functions in more detail.

Figure 2:
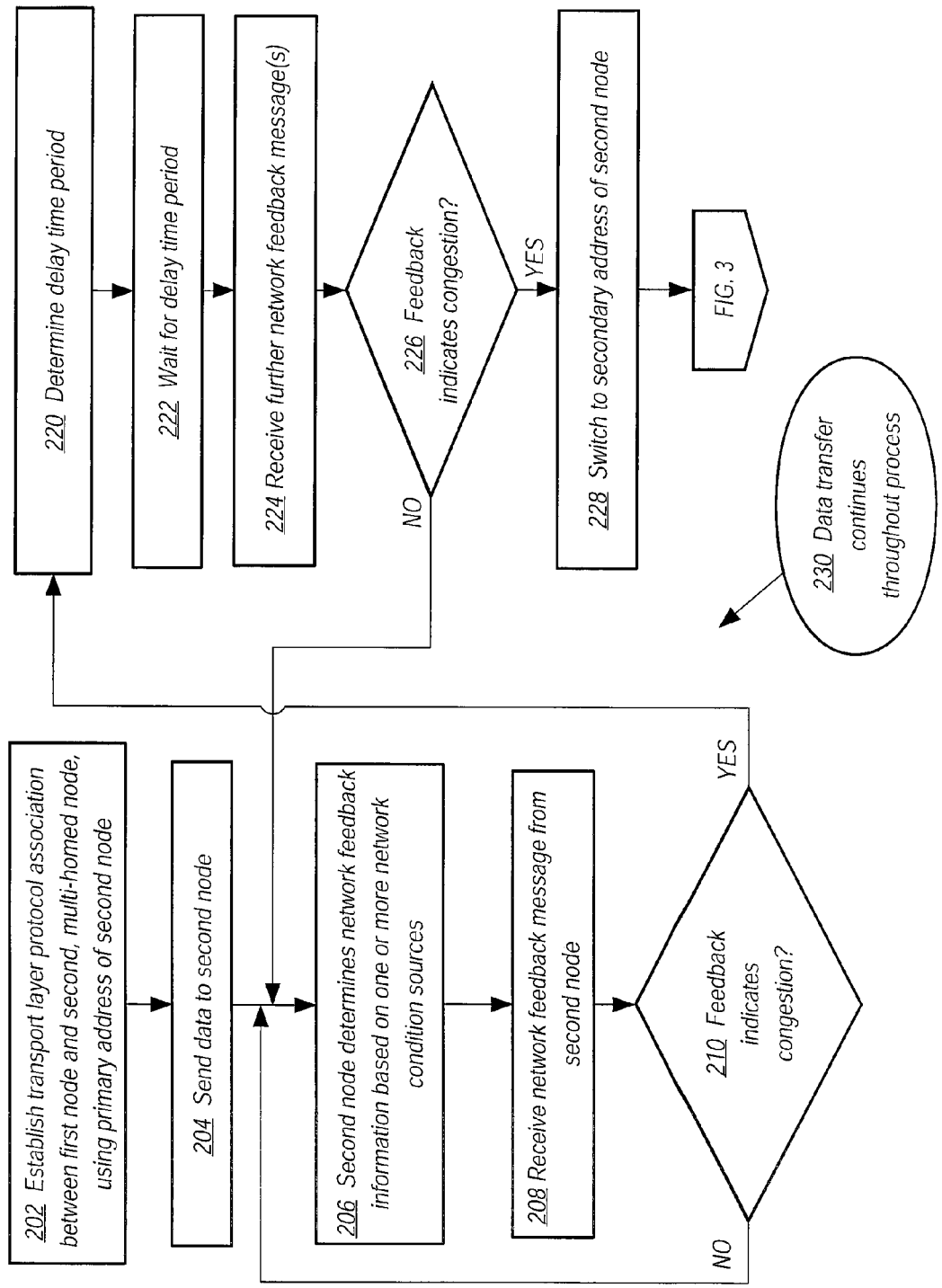
FIG. 2 is a flow diagram that illustrates a high level overview of one embodiment of a method for selecting paths in multi-homed transport-layer network associations.
Figure 3:
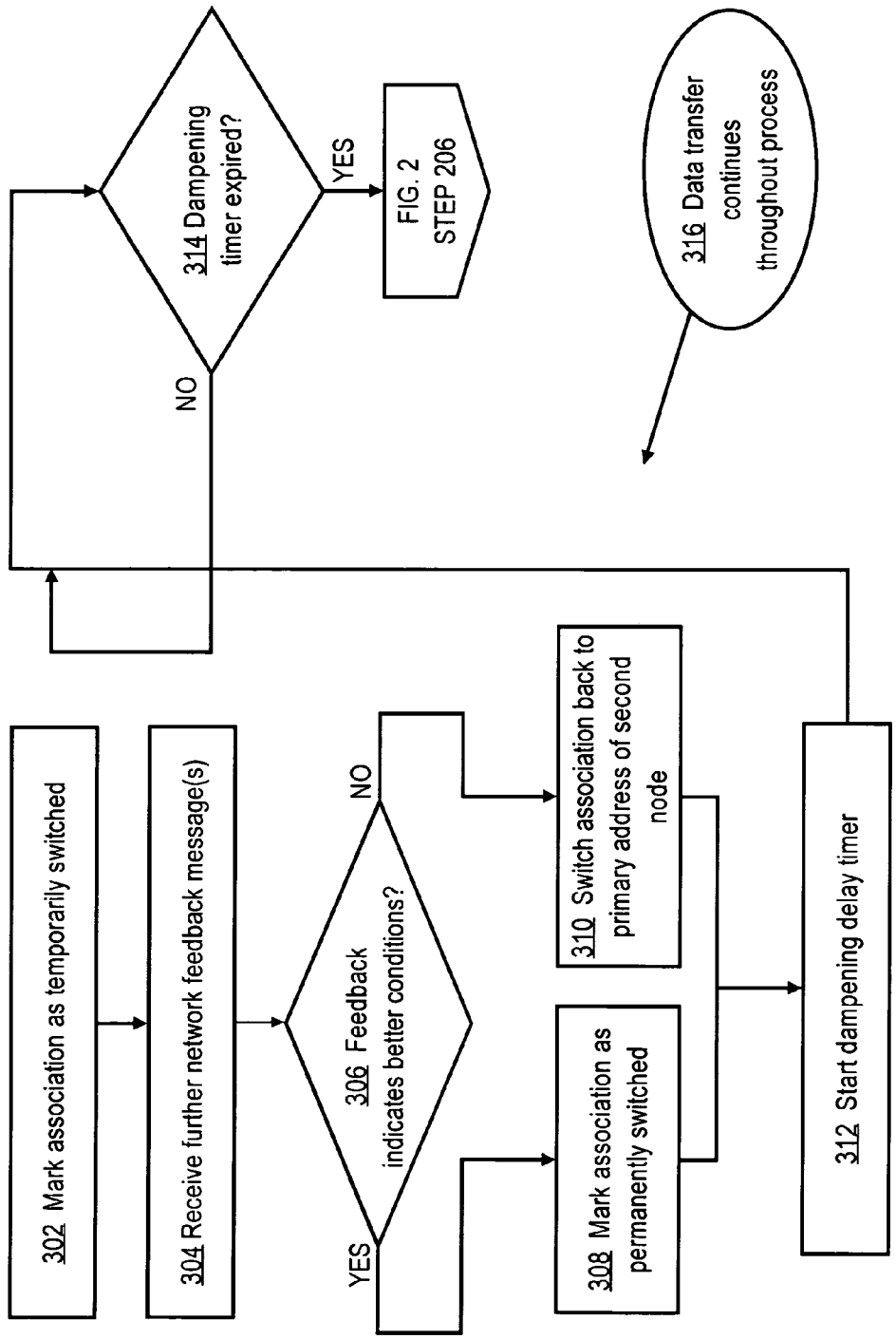
FIG. 3 is a flow diagram that illustrates a high level overview of optional steps for re-switching an association and dampening switching behavior.
Figure 4:
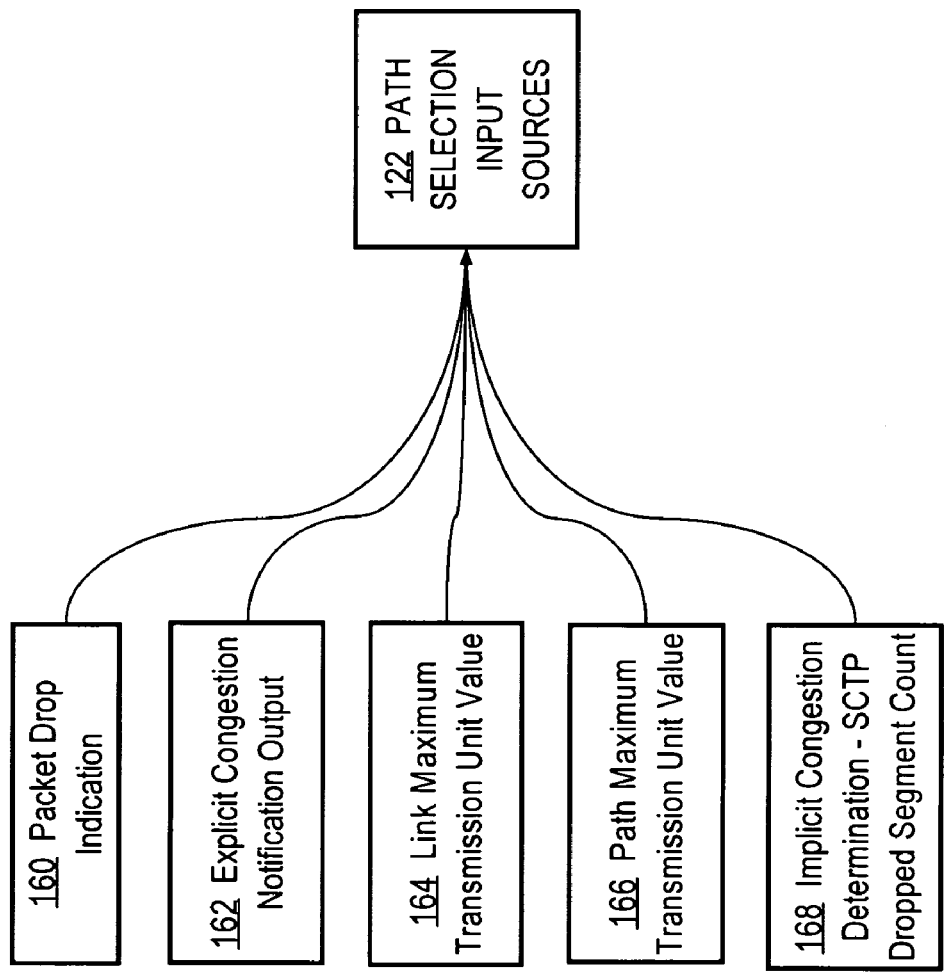
FIG. 4 is a block diagram that illustrates sources of path selection input that may be used in the processes of FIG. 2, FIG. 3.

FIG. 2 is a flow diagram that illustrates a high level overview of one embodiment of a method for selecting paths in multi-homed transport-layer network associations. FIG. 3 is a flow diagram that illustrates a high level overview of optional steps for re-switching an association and dampening switching behavior. FIG. 4 is a block diagram that illustrates sources of path selection input that may be used in the processes of FIG. 2, FIG. 3.

For purposes of illustrating a clear example, FIG. 2, FIG. 3, and FIG. 4 are described herein in the context of FIG. 1. However, the broad approach of FIG. 2, FIG. 3, and FIG. 4 may be practiced in contexts, arrangements and embodiments other than as shown in FIG. 1, which is provided merely as one example.

The processes of FIG. 2, FIG. 3 generally depict steps that a sending node such as endpoint 102 performs. Referring first to FIG. 2, in step 202, a transport layer association is established between a first node and a second, multi-homed node, using the primary address of the second node. The first node and second node are network nodes such as end stations, routers or switches. For example, using SCTP stack 124 the endpoint 102 establishes an SCTP association to endpoint 118 using the destination IP address of interface 119A. Techniques for establishing SCTP associations are described in Stewart et al. and RFC 2960. In this description, the terms "association" and "connection" are equivalent and refer to a logical coupling of endpoints in a network based on a transport-layer network protocol such as SCTP, TCP, etc.

In step 204, data is sent to the second node. For example, endpoint 102 sends data to endpoint 118 on the first path directed to the first interface 119A.

At step 206, the second node determines network feedback information based on one or more network condition sources. For example, at node 118 SCTP feedback logic 128 receives input from path selection input sources 122 that indicates a characteristic of a path to node 102. The path selection input sources 122 may comprise any appropriate information about path characteristics that may be useful in determining whether to change paths. As examples, referring now to FIG. 4, path selection input sources 122 may comprise a packet drop indication 160, explicit congestion notification output 162, link maximum transmission unit (MTU) value 165, path MTU value 166, or an implicit congestion determination 168 such as a dropped segment count determined by SCTP stack 126 for a particular path and association.

In one embodiment, packet drop indication 160 comprises an implementation of the packet drop capability as proposed in the IETF Internet-draft document entitled draft-stewart-sctp-pktdrprep-02.txt ("Stewart"). The packet drop mechanism defined in Stewart provides feedback to the sender that packet corruption was encountered on the way, and hence that a packet did not arrive at an intended end host. In particular, Stewart defines SCTP chunks that can communicate from an SCTP receiver to an SCTP sender that packet drops occurred during transmission. Such feedback prevents the collapse of the congestion window data structure that the sender maintains, because the path is not interpreted to have congestion.

Applications 103A, 103B can set minimum numbers of packet drops for which a path is considered valid and healthy. For example, at node 102 application 103A can inform SCTP stack 124 that to retain the current path as primary, the packet drop count should be no more than 5 segments per 100 segments that have been sent. If the drop count exceeds this limit, then SCTP stack 124 should switch to the other link as the primary.

In an embodiment, explicit congestion notification output 162 is received from a software implementation of ECN (Explicit Congestion Notification) for TCP, which signals the end host about impending congestion at a middle router. An example commercial implementation of ECN is provided with the TCP stack of Cisco IOS® Software from Cisco Systems, Inc., San Jose, Calif. In conventional practice ECN information is used to adjust the TCP congestion window; however, in the approach herein the congestion information from ECN is used to determine if the current path should remain primary and to inform a decision to switch to a secondary path. ECN is not usable for that purpose with TCP because TCP does not support multi-homed connections or nodes. Based on this information, if a primary path shows impending congestion on the link, then SCTP stack 124 should switch to the secondary path. This approach helps to avoid further congestion on the primary path. Further, this approach avoids collapse of the congestion window, which causes the SCTP stack 124 to move to a slow start transmission approach, causing a drastic reduction in performance of the connection.

In an embodiment, link MTU value 164 is received from an implementation of the techniques described in co-pending US application Number, filed Date, of inventors Mitesh Dalal et al., entitled "Method to discover path MTU using transport feedback." Link MTU value 164 describes the MTU for a particular link in a path from endpoint 102 to endpoint 118, such as link 107 between routers 106, 108.

Additionally or alternatively, an implementation can determine path MTU as indicated by path MTU value 168. An implementation can use the techniques of Mogul et al., "Path MTU Discovery," IETF RFC 1191 (1990) to generate path MTU value 168.

In this approach, the MTU of a link or an entire path can be used as an important factor in determining a path to be the primary path. In one embodiment, MTU alone is not the sole factor determining whether a path switch should occur, because bandwidth and RTT are also considered. However, an advisable general approach is that the higher MTU path is always preferred. Periodic MTU measurement is performed on the primary and secondary path using either the RFC 1191 technique or the technique described in Dalal et al. Depending on the dynamic MTU changes, the current value of MTU can be used as a criterion to select the best path.

As part of step 206, the second node creates and sends the first node a message containing the network feedback information that is determined in step 206. In an SCTP implementation, SCTP feedback logic 128 may generate and pass an SCTP chunk containing the network feedback information to SCTP stack 126 of endpoint 118, which sends the SCTP chunk to endpoint 102 on the particular association.

In step 208, the network feedback message from the second node is received. In step 210, a test is performed to determine whether the network feedback information indicates congestion or other characteristics. "Congestion," as stated in step 210, is merely one example of characteristics that could be reported in the network feedback information and that could provide the basis for a change in path for a multi-homed node.

If no congestion is indicated, then control returns to step 204 or step 206. Thus, the loop of steps 204, 206, 208, 210 is intended to represent periodically testing received network feedback information to determine whether responsive action needs to be taken. Such testing may occur at any time as data is communicated on an association between nodes, and may occur at regular or irregular intervals.

If congestion is indicated, then control transfers to step 220 at which a delay time period is determined. At step 222 waiting is performed for a period indicated by the delay time that is determined at step 220. To prevent all associations on the endpoint for a particular prefix from switching over at the same time and potentially causing congestion on the secondary path, steps 220, 222 may use a randomly selected cooling-off time before which the association should not switch from primary to secondary. In one embodiment, the time determined at step 220 is a time value randomly selected from the range of zero to five seconds, although any other suitable time may be used. The time may be determined based upon the round trip time (RTT) of packets traversing the association.

Steps 220, 222 effectively implement a back-off behavior that helps in switching only some connections to the secondary at a given time and hence helps distribute load. In step 224, further network feedback messages are received. In step 226, a test is performed to determine whether the further network feedback messages indicate congestion. If not, then control returns to steps 204, 206. If congestion is indicated, then in step 228 a switch to a secondary address of the second node is performed. For example, SCTP stack 124 of endpoint 102 switches to a second path routed through LAN 104 and routers 110, 116, 114, 112, and 106 to interface 119B.

Using this approach, connections that are in the cooling phase continue to monitor the current path for improvements in path characteristics. Such monitoring is appropriate given that the switchover of some connections might have alleviated the load on the primary path, and hence the congestion scenario might have actually improved. However, if further monitoring indicates that congestion continues to exist on a connection, then a switchover to the secondary path should proceed, as indicated at steps 226, 228.

Referring now to FIG. 3, in step 302, the association is marked as temporarily switched. For example, SCTP stack 124 marks the association as temporarily switched in a control block data structure that the stack maintains for each association. In step 304, one or more further network feedback messages are received. In step 306, a test is performed to determine whether the further network feedback messages indicate better conditions on the secondary path to which the association was switched. If so, then in step 308 the association is marked as permanently switched. If conditions have not improved as a result of the switch, then in step 310 the association is switched back to the primary address of the second node.

In general, the approach of FIG. 3, steps 302, 304, 306, 308, 310 implements a monitor and probe phase in which SCTP stack 124 tracks the exchange of data on the switched-over association to determine if the new path offers better performance than the earlier path. If better performance is found, then the temporary switchover is marked as permanent. If poorer performance is found, the connection continues to use the earlier primary path.

In step 312, a dampening delay timer is started. In step 314, a test is performed to determine whether the dampening delay timer is expired. If so, then control returns to step 206, at which point network conditions can be re-evaluated and another switch back to the primary path can be considered. During all of FIG. 3, data transfer continues on the association, as indicated by block 316.

The approach of step 312, 314 is to clamp a dampening mechanism on the association, to prevent a switchover or probe from occurring again immediately. This approach has two benefits: it alleviates the processing burden involved in evaluating path feedback information, and it alleviates the processing overhead and resource consumption involved in performing a switchover to a new path.

In one embodiment, the dampening delay timer has a period of five minutes to ten minutes, but any other suitable time period may be used. After the dampening time period, the SCTP stack can again examine the alternate path to determine whether the alternative path offers better performance than the current path in case the path dynamics have changed.

The use of a dampening delay as shown in steps 312, 314 is optional and can be omitted in an embodiment.

4.0 Implementation Mechanisms—Hardware Overview

Figure 5:
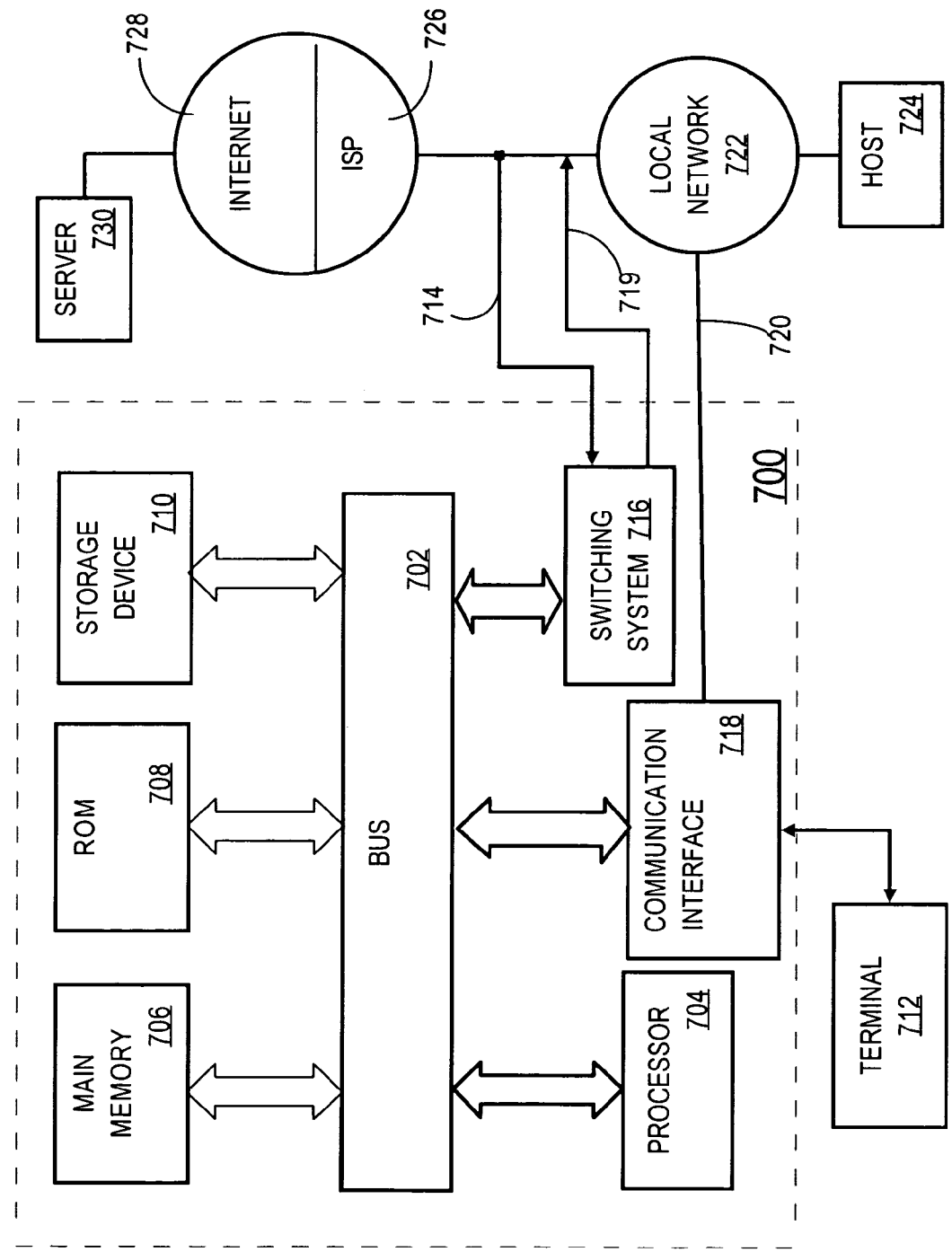
FIG. 5 is a block diagram that illustrates a computer system upon which an embodiment may be implemented.

FIG. 5 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for selecting paths in multi-homed transport-layer network associations. According to one embodiment of the invention, selecting paths in multi-homed transport-layer network associations is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for selecting paths in multi-homed transport-layer network associations as described herein.

Processor 704 may execute the received code as it is received, and/or stored in storage device 710, or other non-volatile storage for later execution. In this manner, computer system 700 may obtain application code in the form of a carrier wave.

5.0 Extensions and Alternatives

The approaches described herein may be implemented to provide intelligent path selection and switching in response to detection of deteriorating or inferior network capabilities on the primary link of a multi-homed association or connection. Embodiments can offer improved performance and throughput, as the connection uses the most optimal available link. Embodiments can implement efficient load balancing by distributing load on multiple links. Embodiments can alleviate router congestion by diverting traffic on an alternate link.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network packet routing device, comprising:
   one or more processors;
   one or more network interfaces that are communicatively coupled both to the one or more processors and to a network for receiving packet flows therefrom;
   a computer-readable volatile or non-volatile medium comprising one or more sequences of instructions which, when executed by the one or more processors, cause the one or more processors to perform the steps of:
   configuring in a data communication network a first node, a second node, and one or more other nodes, wherein the second node comprises at least a first interface that is addressable using at least one primary network address and a second interface that is addressable using at least one secondary network address, wherein the configuring causes network packets identifying the at least one primary network address to traverse a first network path and causes network packets identifying the at least one secondary network address to traverse a second network path that is routed physically separately from the first network path;

establishing a transport layer network protocol association in the network between the first node and the second node;

sending one or more data messages to the second node, wherein the data messages identify the at least one primary network address;

receiving network feedback information that indicates one or more performance characteristics of the first network path;

wherein the one or more performance characteristics comprise congestion on the first network path; and in response to receiving the network feedback information, automatically modifying the data messages to identify the secondary network address.

2. A device as recited in claim 1, wherein the transport layer network protocol is Stream Control Transmission Protocol (SCTP).

3. A device as recited in claim 2, wherein the network feedback information is communicated in an SCTP network feedback chunk.

4. A device as recited in claim 1, wherein automatically modifying the data messages to identify the at least one secondary network address is delayed by a specified time.

5. A device as recited in claim 1, wherein the transport layer network protocol association is marked as temporarily switched, and wherein the transport layer network protocol association is subsequently marked as permanently switched only upon receiving one or more further network feedback messages that indicate continued congestion on the first network path.

6. A device as recited in claim 5, wherein the data messages are automatically modified to identify the at least one primary network address when the one or more further network feedback messages indicate one or more improved performance characteristics on the first network path.

7. A device as recited in claim 6, wherein a dampening timer prevents further automatically modifying the data messages to identify the at least one secondary network address until after a specified time.

8. A device as recited in claim 1, wherein the network feedback information comprises any of a packet drop indication, an explicit congestion notification, a link maximum transmission unit value, a path maximum transmission unit value, and an implicit congestion determination based on a dropped segment count.

9. A network packet routing device, comprising:

one or more processors;

one or more network interfaces that are communicatively coupled both to the one or more processors and to a network for receiving packet flows therefrom;

means for configuring in a data communication network a first node, a second node, and one or more other nodes, wherein the second node comprises at least a first interface that is addressable using at least one primary network address and a second interface that is addressable using at least one secondary network address, wherein the configuring causes network packets identifying the at least one primary network address to traverse a first network path and causes network packets identifying the at least one secondary network address to traverse a second network path that is routed physically separately from the first network path;

means for establishing a transport layer network protocol association in the network between the first node and the second node;

means for sending one or more data messages to the second node, wherein the data messages identify the at least one primary network address;

means for receiving network feedback information that indicates one or more performance characteristics of the first network path;

wherein the one or more performance characteristics comprise congestion on the first network path; and means for automatically modifying the data messages to identify the at least one secondary network address in response to receiving the network feedback information.

10. A device as recited in claim 9, wherein the transport layer network protocol is Stream Control Transmission Protocol (SCTP).

11. A device as recited in claim 10, wherein the network feedback information is communicated in an SCTP network feedback chunk.

12. A device as recited in claim 9, wherein automatically modifying the data messages to identify the at least one secondary network address is delayed by a specified time.

13. A device as recited in claim 9, wherein the transport layer network protocol association is marked as temporarily switched, and wherein the transport layer network protocol association is subsequently marked as permanently switched only upon receiving one or more further network feedback messages that indicate continued congestion on the first network path.

14. A device as recited in claim 13, wherein the data messages are automatically modified to identify the at least one primary network address when the one or more further network feedback messages indicate one or more improved performance characteristics on the first network path.

15. A device as recited in claim 14, wherein a dampening timer prevents further automatically modifying the data messages to identify the at least one secondary network address until after a specified time.

16. A device as recited in claim 9, wherein the network feedback information comprises any of a packet drop indication, an explicit congestion notification, a link maximum transmission unit value, a path maximum transmission unit value, and an implicit congestion determination based on a dropped segment count.

17. A method, comprising:

configuring in a data communication network a first node, a second node, and one or more other nodes, wherein the second node comprises at least a first interface that is addressable using at least one primary network address and a second interface that is addressable using at least one secondary network address, wherein the configuring causes network packets identifying the at least one primary network address to traverse a first network path and causes network packets identifying the at least one secondary network address to traverse a second network path that is routed physically separately from the first network path;

establishing, at a computing device, a transport layer network protocol association in the data communication network between the first node and the second node;

sending one or more data messages to the second node, wherein the data messages identify the at least one primary network address;

receiving network feedback information that indicates one or more performance characteristics of the first network path;

wherein the one or more performance characteristics comprise congestion on the first network path; and in response to receiving the network feedback information, automatically modifying the data messages to identify the secondary network address.

18. A method as recited in claim 17, performed in any of a router for a packet-switched network and a switch for a packet-switched network.

* * * * *